Dec. 30, 1941.  P. K. HOLLINGSWORTH  2,268,150
HEDGE CLIPPER
Filed Nov. 12, 1940  2 Sheets-Sheet 1
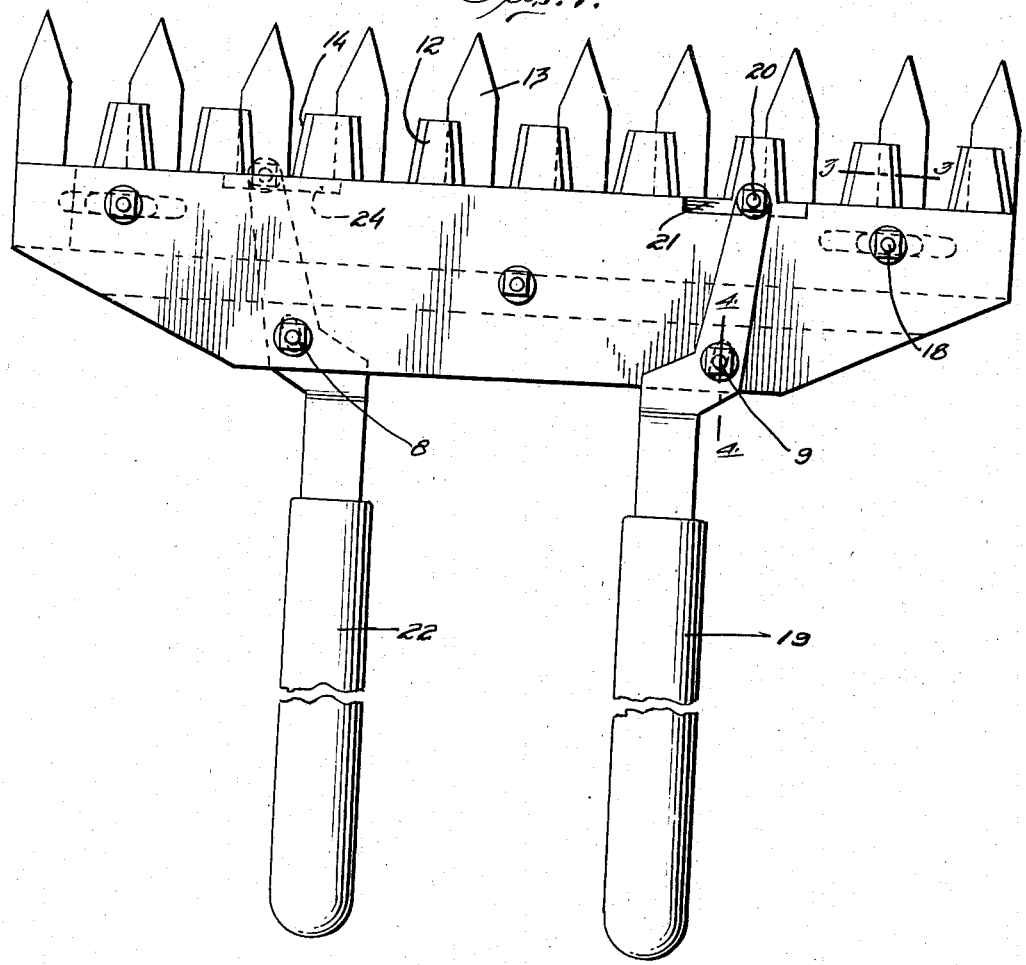
Inventor
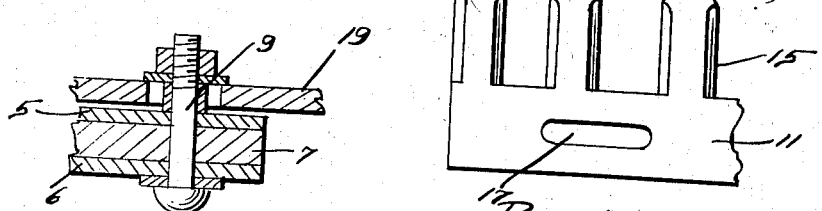
Prentice K. Hollingsworth
By Clarence A. O'Brien
Attorney Dec. 30, 1941.    P. K. HOLLINGSWORTH    2,268,150
HEDGE CLIPPER
Filed Nov. 12, 1940    2 Sheets-Sheet 2
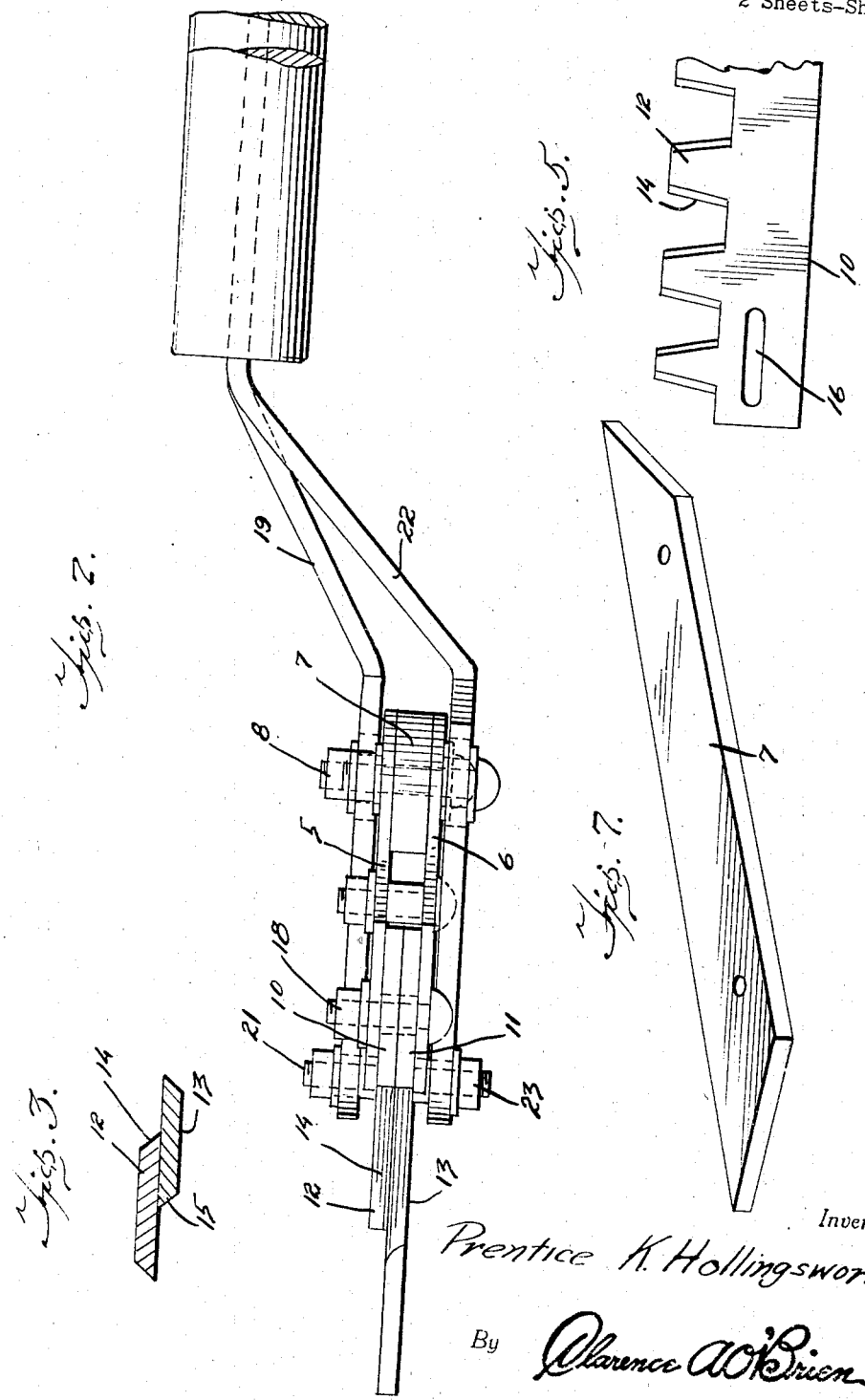
Inventor
Prentice K. Hollingsworth
By Clarence A. O'Brien
Attorney Patented Dec. 30, 1941

2,268,150

UNITED STATES PATENT OFFICE 2,268,150

HEDGE CLIPPER

Prentice K. Hollingsworth, Shreveport, La., assignor of one-third to Ralph E. Hollingsworth, Shreveport, La.

Application November 12, 1940, Serial No. 365,343

7 Claims. (Cl. 30—211)

The present invention relates to new and useful improvements in hedge clippers and has for its primary object to provide a manually operated clipper embodying a pair of reciprocating coacting cutting blades, each blade arranged for independent operation by a handle member and in which the blades are provided with cutting teeth arranged in staggered or delayed cutting relation with respect to each other so that the force required for operating the blades may be reduced.

A further object is to provide a device of this character of simple and practical construction, which is efficient in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a top plan view,

Figure 2 is a side elevational view,

Figure 3 is a sectional view through a pair of the cooperating cutting teeth, taken substantially on a line 3—3 of Figure 1, Figure 4 is a fragmentary perspective view through one of the pivoted connections for one of the handles taken along a line 4—4 of Figure 1, Figure 5 is a fragmentary top plan view of one of the cutting blades, Figure 6 is a fragmentary bottom plan view of another of the blades, and Figure 7 is a perspective view of the spacing block between the guide plates of the blades.

Referring now to the drawings in detail, wherein for the purpose of illustration I have disclosed a preferred embodiment of the invention, the numeral 5 designates an upper guide plate while the numeral 6 designates a lower guide plate, which are secured in spaced relation by means of a spacing block 7, the spacing block being positioned between the plate adjacent the rear edge thereof and secured in position by means of bolts 8 and 9.

Reciprocably mounted between the upper and lower plates at the front end thereof is an upper blade 10 and a lower blade 11, the blade 10 being formed with a plurality of forwardly extending spaced cutting teeth 12 while the lower blade 11 is likewise formed with a plurality of forwardly extending spaced cutting teeth 13. The teeth 12 and 13 are arranged in coacting cutting engagement, the teeth 12 being blunt at their outer ends, while the teeth 13 are pointed, the last named set of teeth projecting outwardly beyond the teeth 12, as shown to advantage in Figures 1 and 2 of the drawings.

The longitudinal edges of the upper teeth 12 are bevelled as shown at 14, while the longitudinal edges of the lower teeth 13, from a point inwardly of the pointed end thereof, are also bevelled on their underside as shown at 15 whereby to provide cooperating cutting edges for the two sets of teeth as more clearly shown in Figure 3 of the drawings.

The upper blade 10 is formed adjacent each end with a longitudinally extending slot 16 while the lower blade 11 is also formed adjacent each end with a longitudinally extending slot 17. The slots 16 and 17 of the respective blades are adapted to partially register for receiving bolts 18 extending through the plates 5 and 6 whereby to guide the blades during the reciprocating action thereof.

A handle 19 is provided for the upper blade 10, the handle being pivoted intermediate its ends to the bolt 9 and having its front end pivoted to a bolt 20 projecting upwardly from the blade 10, the bolt 20 being movable in a notch 21 formed in the front end of the upper plate 5.

Likewise a handle 22 is pivoted intermediate its ends to the under side of the plate 6 on the bolt 8, the handle being pivotally connected at its front end to the lower blade 11 by a bolt 23, the bolt 23 likewise being movable in a notch 24 formed in the front edge of the plate 6.

As indicated in Figure 1 of the drawings, the cutting teeth of each blade are constructed of irregular widths and the longitudinal edges of the teeth 12 are tapered. Likewise the space between the teeth of each blade vary in width. Accordingly, all of the teeth will not have their cutting edges in the same cutting cooperation at any one time, but the cutting action will be staggered so that certain of the teeth will have a delayed cutting action with respect to the other of the teeth. By this arrangement less exertion will be required to operate the cutter during any predetermined period of the cutting action.

It is believed the details of construction, advantages and manner of use of the device will be readily apparent from the foregoing without further detailed explanation.

Having thus described the invention, what I claim is:

1. A cutter comprising a pair of cutting blades each having cooperating cutting teeth, certain of the teeth of one blade being staggered in cutting relation with the teeth of the other blade for delayed cutting engagement, means for mounting the blades in reciprocating cutting relation and means for actuating at least one blade.

2. A cutter comprising a pair of cutting blades each having cooperating cutting teeth, said teeth of the respective blades being irregularly spaced apart to provide a delayed cutting engagement for certain of the teeth, means for mounting the blades in reciprocating cutting relation and an operating handle attached to each blade.

3. A cutter comprising upper and lower plates, a spacing block securing the plates in spaced relation, a pair of blades mounted between the plates in superposed reciprocating relation, guide pins and slots between the plates and the blades, said blades having forwardly projecting cooperating cutting teeth, the teeth of each blade being irregularly spaced from each other and staggered in cutting relation with the teeth of the other blade to delay the cutting engagement of certain of the teeth, and a handle for each blade pivoted respectively to the plates.

4. A cutter comprising a pair of cutting blades each having cooperating cutting teeth, certain of the teeth of one blade being arranged to begin cutting engagement with the teeth of the other blade subsequent to the cutting engagement of the remaining teeth, and means for actuating the blades.

5. A cutter comprising a pair of cutting blades each having cooperating cutting teeth provided with cutting edges at opposite edges of the blades, said teeth of the respective blades being irregularly spaced apart to produce a cutting engagement between certain of the teeth while the remaining teeth are out of cutting engagement and means for actuating at least one blade.

6. A cutter comprising a pair of cutting blades each having cooperating cutting teeth projecting laterally from one edge, the teeth of one blade being superposed on the teeth of the other blade, each side edge of the teeth constituting a cutting edge, the teeth of one blade being irregularly spaced apart to provide for the cutting engagement of certain of said teeth with the teeth of the other blade while the remaining teeth are disengaged and means for actuating at least one blade.

7. A cutter comprising a pair of cutting blades each having cooperating cutting teeth projecting laterally from one edge, the teeth of one blade being superposed on the teeth of the other blade and the teeth of at least one blade being of irregular width and irregularly spaced apart to provide a delayed cutting engagement between the teeth of the respective blades and means for actuating at least one blade.

PRENTICE K. HOLLINGSWORTH.